Nov. 29, 1960  W. W. GLEASON  2,962,088
SPRING ASSEMBLY
Filed Feb. 10, 1958  2 Sheets-Sheet 1

INVENTOR.
William W. Gleason
BY
Ooms, McDougall, Williams & Hersh
Attorneys

Nov. 29, 1960 W. W. GLEASON 2,962,088
SPRING ASSEMBLY
Filed Feb. 10, 1958 2 Sheets-Sheet 2

INVENTOR.
William W. Gleason
BY
Ooms, McDougall, Williams & Hersh
Attorneys

United States Patent Office 2,962,088
Patented Nov. 29, 1960

2,962,088

SPRING ASSEMBLY

William W. Gleason, Chicago, Ill., assignor to Nachman Corporation, Chicago, Ill., a corporation of Illinois Filed Feb. 10, 1958, Ser. No. 714,297

6 Claims. (Cl. 155—179)

This invention relates to a new and improved spring assembly adaptable for use in various types of upholstered furniture.

One of the objects of the invention is a spring assembly in which rows of helical springs are so joined as to distribute pressure exerted on any one to other springs in the series.

Another objective is to provide a spring assembly in which the means of so joining the individual component springs may also be used as an anchor for them, restraining them against lateral tilting and consequent enmeshment within the coils of adjacent springs.

A further object of the invention is to provide a mesh or network across the ends of the springs to prevent intrusion by fabric padding or covering material into the central area of the spring assembly and the individual springs.

Figure 1:
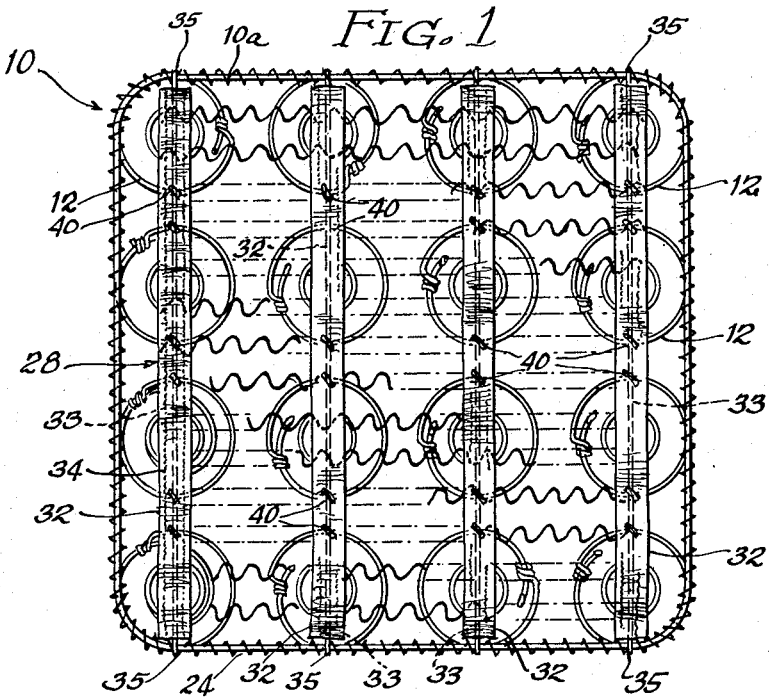
Figure 2:
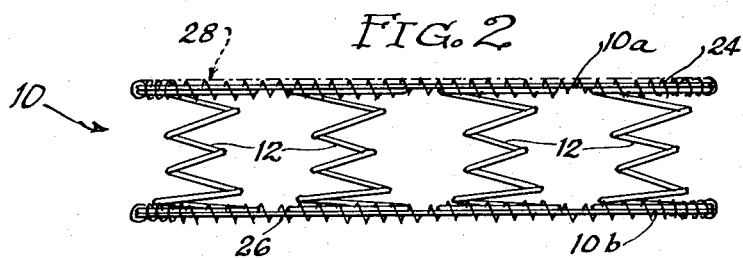
Figure 3:
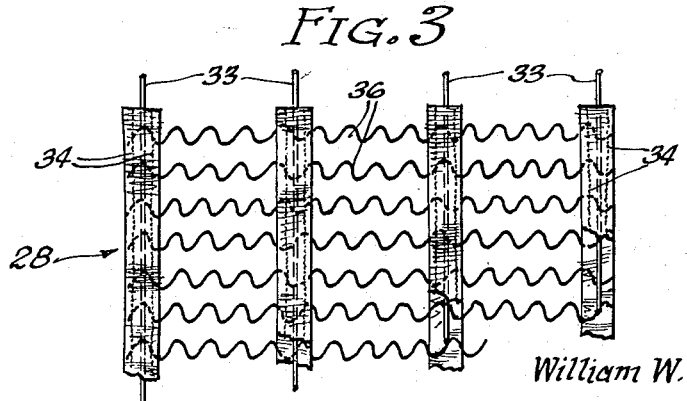
Figure 4:
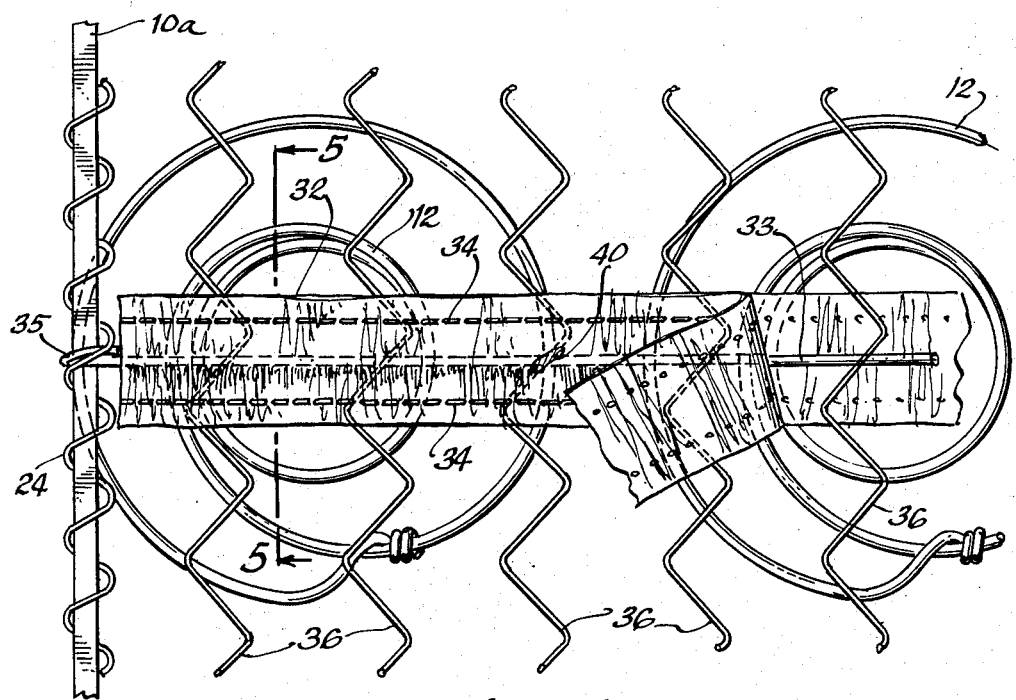
Figure 5:
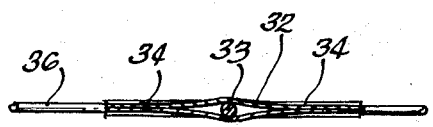

These advantages, together with others, will appear hereinafter; and, for the purposes of illustrating an embodiment of device, without limiting the scope of the claims, the accompanying drawing shows in Fig. 1 a plan view of an assembly embodying the features of this invention, partially cut away to expose the internal construction;

Fig. 2 an elevational side view of a plurality of individual springs aligned and joined to the frame as at the margins of the assembly;

Fig. 3 a fragmentary plan view, showing the network of screening members;

Fig. 4 a fragmentary and detailed plan view showing the interconnection of the springs to the stringers; and Fig. 5 a cross-sectional view of a stringer taken along the line 5—5 in Fig. 4.

The frame 10 of the assembly may be formed of a pair of top and bottom border wires or rods 10a, 10b, which may be fabricated of a substantially rigid, but flexible, material, such as steel, plastics, or the like. These border wires 10a, 10b may be substantially identical in form and size so that they may overlie each other in substantially parallel relation at a distance substantially equal to the length of the component springs 12, as illustrated in Fig. 2 and more fully described hereinafter.

The frame 10 may be generally the shape of the piece of upholstery to be supported by the frame 10; for example, rectangular as shown in the drawings. The ultimate contours of the upholstery may, of course, be modified by the contours of padding and covering fabric (not shown) which may be positioned over and around the frame 10 and spring assembly.

Disposed between the border wires 10a, 10b with their longitudinal axes perpendicular to the plane defined by the frame members 10a, 10b are a plurality of helical springs 12, arranged in spaced crosswise and lengthwise rows between the border wires 10a, 10b. The terminal coils of the outermost coil springs 12 in the crosswise and lengthwise rows are connected to the border wires 10a, 10b, as by means of helical tie wires 24 and 26.

To the present, the description relates to a conventional spring assembly with the exception that in a conventional assembly, the coil springs aligned in the crosswise and lengthwise rows are usually interconnected by resilient means in the form of helicals which are threaded throughout the aligned edges of the terminal coils of the coil springs and which are tied at their ends to the border wires.

The concepts of this invention reside in the combination of a base spring assembly of the type described with a covering spring assembly hereinafter referred to as a stringer, of the type described in my copending application Ser. No. 680,836, filed August 28, 1957, and entitled "Spring Assembly and Element for Use in Same," of which this application is a continuation-in-part. In the aforementioned copending application, description is made of a covering spring member formed of a plurality of elongate wire members 36 arranged in spaced apart parallel relation in which they are secured by tapes 32 extending crosswise both above and below the wires 36 to sandwich the wires therebetween. The pairs of tapes are secured one to the other with the wires in between by a suitable interconnecting means, such as by adhesives, staples, or the like, or preferably by stitching 34 which tends to interconnect the tapes while also securing the wires in the desired location between the tapes.

The covering spring 28 is intended to lie flat over the top and/or bottom of the surfaces of the assembled base spring to protect the open areas between the coil springs from the infiltration of padding and simultaneously to provide additional resiliency and support to supplement the action of the base spring and to distribute the load. The improvement embodied in the construction described and claimed herein resides in the fabrication of the covering spring 28 to include an element which enhances its function in the spring action and which operates simultaneously to interconnect the coil springs of the base spring assembly in a manner to eliminate the need for helical tie wires as heretofore employed. The additional element, to be described, operates also to interconnect the coil springs and the border wires of the base spring assembly to the covering spring 28 to provide an interconnected unit of improved spring action and support.

For this purpose, tapes of the covering spring are adapted to be aligned with each of the rows in one direction of the coil springs in the base spring assembly and each tape is formed to include a rod 33 of spring metal wire which extends continuously therebetween from one end of the base spring to the other. The ends 35 of the rod 33 are secured to the adjacent border wires 10a and 10b of the base spring assembly, as by twisting the ends about the border wires. The rods 33 are further connected to the terminal coils of the adjacent coil springs 12 by suitable tie means 40, as represented by metal clips, or by fabric cords and the like thereby to interconnect the terminal coils of the coil springs with the covering spring 28 which in turn is connected to the border wires in a manner to militate against inadvertent relative movements between the elements such as would otherwise cause misalignments. The tie connections 40 may be provided at either or both of the points where the rods 33 cross over the terminal coils of the adjacent coil springs.

As previously described, the wires 36 are preferably formed to a zig-zag shape so as to provide for greater resiliency and maximum coverage of the area between the terminal coils of the coil springs 12. Instead, the wires may be formed of straight wires, or to other contours throughout their length and the wire elements themselves may be of circular cross-section or in the form of rods of various polygonal shapes. When formed of zig-zag or other undulated shape for maximum coverage and increased resiliency and support, it is desirable to have the wires arranged to lie in a single plane which is parallel with the top surface or the bottom surface of the base spring assembly so as to provide for a receptive flat surface for the padding or cover. It is desirable also to form the wires 36 of a length such that the wires will terminate in the area between the outer tapes 32 thereby to conceal the ends and avoid the dangers which might arise from their exposure.

It is apparent that the penetration of padding into the base spring assembly leads not only to non-uniformities in the cushion but it also threatens to clog the zones within the springs 12 between the coils in a manner to impede the compression and expansions of the coil springs as intended in the spring assembly. It will be apparent further that the modification in the construction of the covering spring assembly permits the elimination of the bothersome and expensive process of connecting the many coil springs of the spring assembly by helical tie wires and it will be evident further that the modification provides for an interconnection between the coil springs of the base spring assembly, the border wires of the base spring assembly and the covering member which results in a unitary construction that is easier to assemble and manufacture and which is capable of greater resiliency and support in its assembled relation with lesser possibility of shifting movement between elements to detract from the flatness and permanence of the resilient supporting surface.

It will be seen that the invention comprises a spring filled upholstery assembly of unusual stability embodying new and improved means for the distribution of load and protection against interferences with the operation of the elements employed therein. It will be understood that changes may be made in the details of construction, arrangement and operation without departing from the spirit of the invention, especially as defined in the following claims.

I claim:

1. A spring assembly comprising upper and lower border frame members, a plurality of coil springs arranged in crosswise and lengthwise rows between said border frame members, means joining the outer portion of the terminal coils of the outer coil springs to the border wires and a surfacing member overlying the terminal coils of said coil springs, comprising a plurality of elongate wires arranged to lie in a single plane in closely spaced-apart parallel relation, means extending crosswise of the wires in spaced parallel relation, means interconnecting the longitudinally extending wires to the crosswise extending means to effect a fixed relation therebetween, a rod forming a part of said interconnecting means extending crosswise of said wires and dimensioned to have a length to span the space between said border wires, means connecting the ends of the rod to the border wires, and means connecting the terminal coils of the coil springs to portions of the rod extending thereover to effect an interconnection between said spring coils and between said spring coils and the surfacing member.

2. A spring assembly as claimed in claim 1 wherein said rod passes over the center point of those spring coils to which said rod is interconnected.

3. A spring assembly as claimed in claim 1 wherein said cross wires are of zig zag configuration.

4. A spring assembly as claimed in claim 1 wherein said crosswise extending means are dimensioned to have a length so as to terminate within the interconnecting means to conceal the ends of said cross wires therebetween.

5. A spring assembly as claimed in claim 1 in which said surfacing member comprises said rod, a plurality of tape portions overlying and underlying said rod, and means joining said tape portions to each other and said crosswise extending means to said tape portions.

6. A spring assembly as claimed in claim 1 in which the interconnecting means comprises a plurality of resilient tapes, one of said tapes underlying and another of said tapes overlying said cross wires, said overlying and said underlying tapes being disposed in an overlying relation to each other and stitched together at their outer margins.

References Cited in the file of this patent

UNITED STATES PATENTS

| | | |
|---|---|---|
| 1,206,073 | Young | Nov. 28, 1916 |
| 2,273,064 | Owens | Feb. 17, 1942 |
| 2,576,729 | Shockey | Nov. 27, 1951 |
| 2,715,230 | Hood | Aug. 16, 1955 |